United States Patent Office 3,123,643
Patented Mar. 3, 1964

3,123,643
BASIC - SUBSTITUTED - ALKYL TRIPHENYL-
ETHANOLS, TRIPHENYLETHYLENES AND
TRIPHENYLETHANES
Frank P. Palopoli, 4113 Judd Drive, Cincinnati 36, Ohio;
Vernon J. Feil, 11667 Van Cleve Ave., Glendale, Ohio;
and Thomas R. Blohm, 7100 Euclid Road, Cincinnati,
Ohio
No Drawing. Filed July 15, 1960, Ser. No. 42,994
6 Claims. (Cl. 260—570)

This invention relates to new chemical compounds which possess useful physiological properties, to intermediates useful in preparing these compounds and to a process for the preparation of these compounds.

The new compounds of the present invention may be regarded as basic substituted alkyl triphenyl ethanol, ethylene and ethane derivatives. They may be represented by the following formulas:

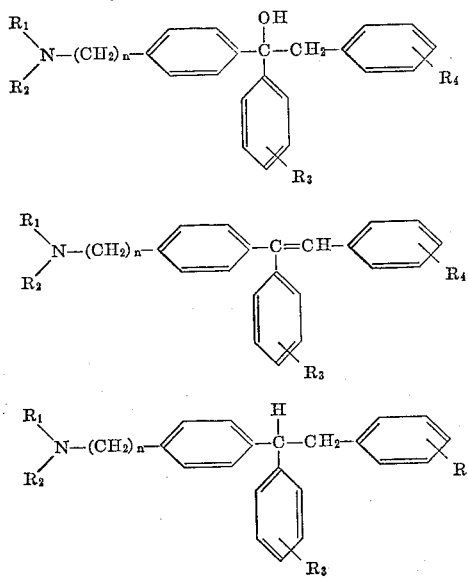

in which $R_1$ and $R_2$ are hydrogen, lower alkyl radicals containing from one to four carbon atoms, and $R_1$ and $R_2$ together with the nitrogen to which they are attached, may form a heterocycle such as piperidino, morpholino, etc.; $n$ is 2, 3, or 4. The remaining $R_3$ and $R_4$ groups may be hydrogen, halogen, lower alkyl, lower alkoxy and trifluoromethyl. The acid addition salts and the quaternary ammonium salts may also be prepared as illustrated in the examples and are included in the scope of the present invention.

The new ethanols can be prepared by reacting a substituted benzylmagnesium chloride or bromide with a benzophenone substituted with a $R_1R_2N$—$(CH_2)_n$— group as follows:

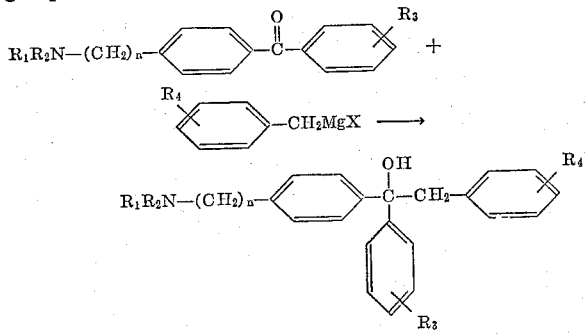

Dehydration of these ethanols with an acid such as hydrochloric gives the ethylenes while catalytic hydrogenation of the ethylenes gives the ethanes. The benzophenones used as intermediates are also new compounds and processes of preparing them are included in the specific examples.

The new ethanol, ethylene and ethane derivatives of the present invention block the synthesis of cholesterol in the animal system and because of this physiological property, they are useful in the control of hypercholesterolemia. They are active orally and may be administered in any conventional dosage form, capsule, tablet, suspension or the like in amounts ranging from 10 mg. to 1 gram per day.

EXAMPLE 1

1-[p-(3-Diethylaminopropyl)Phenyl]-1-(p-Tolyl)-
2-(p-Chlorophenyl)Ethanol

A mixture of 150 g. (0.75 mole) of (3-bromopropyl)benzene and 2 g. of finely divided iron powder was cooled in an ice bath and stirred while 120 g. (0.75 mole) of bromine was added. After the addition of bromine was complete the mixture was allowed to warm to room temperature and stirred for 2 hours. The organic material was separated, washed with water and dried over anhydrous magnesium sulfate. The material was fractionally distilled under vacuum to give 3-(bromophenyl)-propyl bromide (predominantly the para isomer), boiling at 123–126° C. at 3 mm. pressure.

The 3-(p-bromophenyl)propyl bromide, 488 g. (1.75 mole), was heated under reflux with 293 g. (4.0 moles) of diethylamine for 23 hours. Ether was added to the cooled reaction mixture and the diethylamine hydrobromide was removed by filtration. The ether and excess diethylamine were removed by distillation and the residue was converted to the hydrochloride salt by the addition of alcoholic hydrogen chloride. The product was recrystallized from butanone to give p-(3-diethylaminopropyl)bromobenzene hydrochloride, melting at 128–130° C.

p - (3 - diethylaminopropyl)bromobenzene hydrochloride, 201 g. (0.66 mole), was converted to the free base by the addition of a solution of the calculated amount of sodium hydroxide in water. The free base, p-(3-diethylaminopropyl)bromobenzene, was extracted into ether and the ether solution was dried over anhydrous magnesium sulfate. To this ether solution was added an ether solution containing 0.82 mole of n-butyllithium. The resulting mixture was stirred for 15 minutes at room temperature, then an ether solution of 100 g. (0.86 mole) of p-tolunitrile was added. This mixture was heated under reflux for 1 hour and then was poured into a mixture of crushed ice and 286 ml. of concentrated hydrochloric acid. The aqueous acid layer was separated and heated on a steam bath for 19 hours. The solution was cooled, made basic by the addition of sodium hydroxide. The basic solution was extracted with ether and the ether solution was dried. After removal of the ether, the residue was fractionally distilled to give p-(3-diethylaminopropyl)-p'-methylbenzophenone, boiling at 201° C. at 0.15 mm.

p-Chlorobenzylmagnesium chloride, prepared from 16.1 g. (0.1 mole) of p-chlorobenzylchloride and 4.8 g. (0.2 g. at.) of magnesium in ether, was added to an ether solution of 15.4 g. (0.05 mole) of p-(3-diethylaminopropyl)-p'-methylbenzophenone.

The mixture was stirred at room temperature for 3 hours and the complex was decomposed with a solution of ammonium chloride. The ether extracts were dried over magnesium sulfate and the residue that remained after removal of solvent was converted to the citrate salt by adding a solution of 9.6 g. (0.05 mole) of citric acid in butanone. The citrate salt, melting at 70–74° C., was converted to the free base, which was recrystallized from petroleum ether to give 1-[p-3-diethylaminopropyl)-phenyl]-1-(p-tolyl) - 2 - (p-chlorophenyl)ethanol, melting at 100–102° C.

EXAMPLE 2

1-[p-(3-Diethylaminopropyl)Phenyl]-1-(p-Tolyl)-2-Phenylethanol

When the p-chlorobenzylmagnesium chloride was replaced with benzylmagnesium chloride in the procedure of Example 1, the dihydrogen citrate salt of 1-[p-(3-diethylaminopropyl)phenyl] - 1 - (p-tolyl)-2-phenylethanol (from butanone) was obtained, melting at 82–84° C.

EXAMPLE 3

1-[p-(3-Diethylaminopropyl)Phenyl]-1-(p-Tolyl)-2-(p-Methoxyphenyl)Ethanol

When the p-chlorobenzylmagnesium chloride was replaced with p-methoxybenzylmagnesium chloride in the procedure of Example 1, the dihydrogen citrate salt of 1 - [p - (3-diethylaminopropyl)phenyl]-1-(p-tolyl)-2-(p-methoxyphenyl)ethanol (from butanone) was obtained, melting at 78–80° C.

EXAMPLE 4

1-[p-(3-Diethylaminopropyl)Phenyl]-1-Phenyl-2-(p-Methoxyphenyl)Ethanol

When benzonitrile is used instead of p-tolunitrile as in Example 1, the benzophenone obtained is p-(3-diethylaminopropyl)benzophenone, boiling at 203° C. at 0.4 mm. When p-chlorobenzylmagnesium chloride was replaced with p-methoxybenzylmagnesium chloride and p-(3-diethylaminopropyl)-p'-methylbenzophenone was replaced with p-(3-diethylaminopropyl)benzophenone in the procedure of Example 1, the dihydrogen citrate salt of 1 - [p - (3 - diethylaminopropyl)phenyl]-1-phenyl-2-(p-methoxyphenyl)ethanol (from butanone) was obtained, melting at 85–86° C.

EXAMPLE 5

1-[p-(3-Diethylaminopropyl)Phenyl]-1-Phenyl-2-(p-Fluorophenyl)Ethanol

When p-chlorobenzylmagnesium chloride was replaced with p-fluorobenzylmagnesium chloride and p-(3-diethylaminopropyl)-p'-methylbenzophenone was replaced with p-(3-diethylaminopropyl)-benzophenone in the procedure of Example 1, the dihydrogen citrate salt of 1-[p-(3-diethylaminopropyl)phenyl] - 1-phenyl-2-(p-fluorophenyl)ethanol (from butanone-ether) was obtained, melting at 77–79° C.

EXAMPLE 6

1-[p-(3-Diethylaminopropyl)Phenyl]-1-(p-Tolyl)-2-Phenylethylene

1 - [p - (3-diethylaminopropyl)phenyl]-1-(p-tolyl)-2-phenylethanol, 4.02 g. (0.01 mole), was refluxed for 4 hours with an excess of alcoholic hydrogen chloride. The alcohol was removed by distillation and the residue was triturated with ether. The crude solid was recrystallized from methylene chloride-ether to give the hydrochloride salt of 1-[p-(3-diethylaminorpopyl)phenyl]-1-(p-tolyl)-2-phenylethylene, melting at 97–100° C.

EXAMPLE 7

1-[p-(3-Diethylaminopropyl)Phenyl]-1-(p-Tolyl)-2-(p-Chlorophenyl)Ethylene

When 1-[p-(3-diethylaminopropyl)phenyl]-1-(p-tolyl)-2-phenylethanol is replaced with 1-[p-(3-diethylaminopropyl)phenyl]-1-(p-tolyl)-2-(p-chlorophenyl)ethanol in the procedure of Example 6, the hydrochloride salt of 1-[p-(3 - diethylaminopropyl)phenyl]-1-(p-tolyl)-2-(p-chlorophenyl)ethylene (from butanone-ether) was obtained, melting at 160–183° C.

EXAMPLE 8

1-[p-(3-Diethylaminopropyl)Phenyl]-1-Phenyl-2-(p-Methoxyphenyl)Ethylene

1 - [p - (3-diethylaminopropyl)phenyl]-1-phenyl-2-(p-methoxyphenyl)ethanol, 3.76 g. (0.009 mole), was heated on a steam bath with an excess of concentrated hydrochloric acid for 5 hours. The mixture was made basic and extracted with ether. The ether extracts were dried over magnesium sulfate and the solvent was removed. To the residue that remained was added 1.75 g. (0.009 mole) of citric acid to give the dihydrogen citrate salt of 1 - [p-(3-diethylaminopropyl)phenyl]-1-phenyl-2-(methoxyphenyl)ethylene (from butanone) melting at 118–120° C.

EXAMPLE 9

1-[p-(3-Diethylaminopropyl)Phenyl]-1-(p-Tolyl)-2-Phenylethane

A mixture of 1.3 g. (0.003 mole) of 1-[p-(3-diethylaminopropyl)phenyl]-1-p-tolyl)-2-phenylethylene hydrochloride and 1 g. of 10% palladium on charcoal in ethanol was hydrogenated at 2 atmospheres of hydrogen until the uptake of hydrogen ceased. The catalyst was removed by filtration and ether was added. The solid obtained was recrystallized from butanone to give the hydrochloride salt of 1-[p-(3-diethylaminopropyl)phenyl] 1-(p-tolyl)-2-phenylethane, melting at 142–144° C.

EXAMPLE 10

1-[p-(3-Diethylaminopropyl)Phenyl]-1-(p-Tolyl)-2-(p-Chlorophenyl)Ethane

When 1-[p-(3-diethylaminopropyl)phenyl]-1-(p-tolyl)-2-phenylethylene hydrochloride is replaced wtih 1-[p-(3-diethylaminopropyl)phenyl] - 1 - (p-tolyl)-2-(p-chlorophenyl)ethylene hydroclhoride in the procedure of Example 9, the hydrochloride salt of 1-[p-(3-diethylaminopropyl)phenyl] - 1 - (p-tolyl)-2-(p-chlorophenyl)ethane (from butanone-ether) was obtained, melting at 127–129° C.

EXAMPLE 11

1-[p-(3-Diethylaminopropyl)Phenyl]-1-(p-Tolyl)-2-(m-Trifluoromethylphenyl)Ethanol When p-chlorobenzylmagnesium chloride was replaced with m-trifluoromethylbenzylmagnesium chloride in the procedure of Example 1, 1-[p-(3-diethylaminopropyl)phenyl] - 1-(p-tolyl)-2-(m-trifluoromethylphenyl)ethanol was obtained.

EXAMPLE 12

1-[p-(2-Diethylaminoethyl)Phenyl]-1-(p-Tolyl)-2-(p-Chlorophenyl)Ethanol

When p-(3-diethylaminopropyl) - p' - methylbenzophenone was replaced with p-(2-diethylaminoethyl)-p'-methylbenzophenone in the procedure of Example 1, the dihydrogen citrate salt of 1-[p-(2-diethylaminoethyl)-phenyl] - 1 - (p - tolyl) - 2 - (p - chlorophenyl)ethanol (from butanone) was obtained, melting at 92–94° C.

EXAMPLE 13

1-[p-(2-Diethylaminoethyl)Phenyl]-1-(p-Tolyl)-2-(p-Chlorophenyl)ethylene

When 1 - [p - (3 - diethylaminopropyl)phenyl] - 1 - (p-tolyl)-2-phenylethanol was replaced with 1-[p-(2-diethylaminoethyl)phenyl] - 1 - (p - tolyl) - 2-(p-chlorophenyl)-ethanol in the procedure of Example 6, the hydrochloride salt of 1-[p-(2-diethylaminoethyl)phenyl]-1-(p-tolyl)-2-(p-chlorophenyl)ethylene (from methylene chloride-ether) was obtained, melting at 150–169° C.

EXAMPLE 14

1-[p-(2-Diethylaminoethyl)Phenyl]-1-(p-Tolyl)-2-(p-Chlorophenyl)Ethane

When 1 - [p - (3 - diethylaminopropyl)phenyl] - 1 - (p- tolyl)-2-phenylethylene hydrochloride was replaced with 1-[p-(2-diethylaminoethyl)phenyl]-1-(p-tolyl)-2-(p-chlorophenyl)ethylene hydrochloride in the procedure of Example 9, the hydrochloric salt of 1-[p-(2-diethylaminoethyl)phenyl]-1-(p-tolyl)-2-(p-chlorophenyl)-ethane (from butanone-ether) was obtained, melting at 141–143° C.

EXAMPLE 15

*1-[p-(3-Piperidinopropyl)Phenyl]-1-(p-Tolyl)-2-(p-Chlorophenyl)Ethanol*

Using the procedure of Example 1, 3-(p-bromophenyl)-propyl bromide is heated with piperidine to give p-(3-piperidinopropyl)bromobenzene, from which p-(3-piperidinopronyl)-p'-methylbenzophenone is prepared. When p-(3-diethylaminopropyl)-p'-methylbenzophenone is replaced with p-(3-piperidinopropyl)-p'-methylbenzophenone in the procedure of Example 1, the dihydrogen citrate salt of 1-[p-(3-piperidinopropyl)phenyl]-1-(p-tolyl)-2-(p-chlorophenyl)ethanol is obtained.

EXAMPLE 16

*1-[p-(3-Dibutylaminopropyl)Phenyl]-1-(p-Tolyl)-2-(p-Chlorophenyl)Ethanol*

When diethylamine is replaced with dibutylamine in the procedure of Example 1, p-(3-dibutylaminopropyl)-p'-methylbenzophenone is obtained. When p-(3-diethylaminopropyl)-p'-methylbenzophenone was replaced with p-(3-dibutylaminopropyl)-p'-methylbenzophenone in the procedure of Example 1, the dihydrogen citrate salt of 1-[p-3-dibutylaminopropyl)phenyl]-1-(p-tolyl)-2-(p-chlorophenyl)ethanol was obtained.

EXAMPLE 17

*1-[p-(3-Diethylaminopropyl)Phenyl]-1,2-Bis(p-Chlorophenyl)Ethanol*

When p-tolunitrile is replaced with p-chlorobenzonitrile in the procedure of Example 1, p-(3-diethylaminopropyl)-p'-chlorobenzophenone is obtained. When p-(3-diethylaminopropyl)-p'-methylbenzophenone was replaced with p-(3-diethylaminopropyl)-p'-chlorobenzophenone in the procedure of Example 1, the dihydrogen citrate salt of 1-[p-(3-diethylaminopropyl)phenyl]-1,2-bis(p-chlorophenyl)ethanol was obtained.

EXAMPLE 18

*1-[p-(3-Diethylaminopropyl)Phenyl]-1-(p-Tolyl)-2-(p-Chlorophenyl)Ethanol Ethobromide*

To a solution of 7.1 g. (0.016 mole) of 1-[p-(3-diethylaminopropyl)phenyl]-1-(p-tolyl)2-(p-chlorophenyl)ethanol in 200 ml. of absolute ethanol was added 10.9 g. (0.1 mole) of ethyl bromide. The solution was allowed to stand at room temperature for 2 weeks. The ethanol and excess ethyl bromide were removed under reduced pressure and the residue was recrystallized twice from methanol-butanone to give 67% of 1-[p-(3-diethylaminopropyl)phenyl]-1-(p-tolyl)-2-(p-chlorophenyl)ethanol ethobromide, melting at 214–216° C.

EXAMPLE 19

*1-[p-(3-Morpholinopropyl)Phenyl]-1-(p-Tolyl)-2-(p-Chlorophenyl)Ethanol*

When 3-(p-bromophenyl)propyl bromide is heated with morpholine, p-(3-morpholinopropyl)bromobenzene is obtained, from which p-(3-morpholinopropyl)-p'-methylbenzophenone is prepared, using the procedure of Example 1. When p-(3-morpholinopropyl)-p'-methylbenzophenone replaces p-(3-diethylaminopropyl)-p'-methylbenzophenone in the procedure of Example 1, 1-[p-(3-morpholinopropyl)phenyl]-1-(p-tolyl)-2-(p-chlorophenyl)-ethanol is obtained as the dihydrogen citrate salt.

We claim:
1. Compounds of the group consisting of those having the formulas:

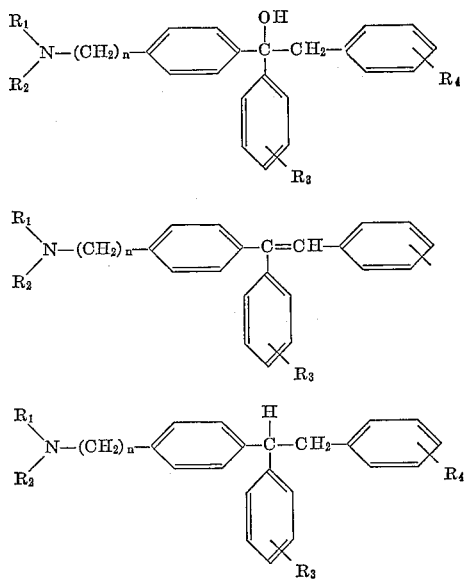

in which $R_1$ and $R_2$ are hydrogen, lower alkyl radicals containing from one to four carbon atoms, and $R_1$ and $R_2$ together with the nitrogen to which they are attached form a heterocyclic radical of the group consisting of piperidino and morpholino, $n$ is a small whole number from two to four inclusive, and $R_3$ and $R_4$ represent radicals of the group consisting of hydrogen, chloro, fluoro, lower alkyl, lower alkoxy and trifluoromethyl.

2. 1-[p-(3-diethylaminopropyl)phenyl]-1-(p-tolyl)-2-(p-chlorophenyl)ethanol.
3. 1-[p-(3-diethylaminopropyl)phenyl]-1-phenyl-2-(p-fluorophenyl)ethanol.
4. 1-[p-(2-diethylaminoethyl)phenyl]-1-(p-tolyl)-2-(p-chlorophenyl)ethanol.
5. 1-[p-(2-diethylaminoethyl)phenyl]-1-(p-tolyl)-2-p-chlorophenyl)ethylene.
6. 1-[p-(2-diethylaminoethyl)phenyl]-1-(p-tolyl)-2-(p-chlorophenyl)ethane.

References Cited in the file of this patent
UNITED STATES PATENTS 3,010,965     Elpern ---------------- Nov. 28, 1961

OTHER REFERENCES

Beilstein: "Organische Chemie," vol. 12, 1st supp., page 560, and vol. 13, page 762.